W. O. SMITH.
FOLLOW-UP INDEX FOR COLLECTION SYSTEMS.
APPLICATION FILED SEPT. 13, 1915.
1,196,603.
Patented Aug. 29, 1916.
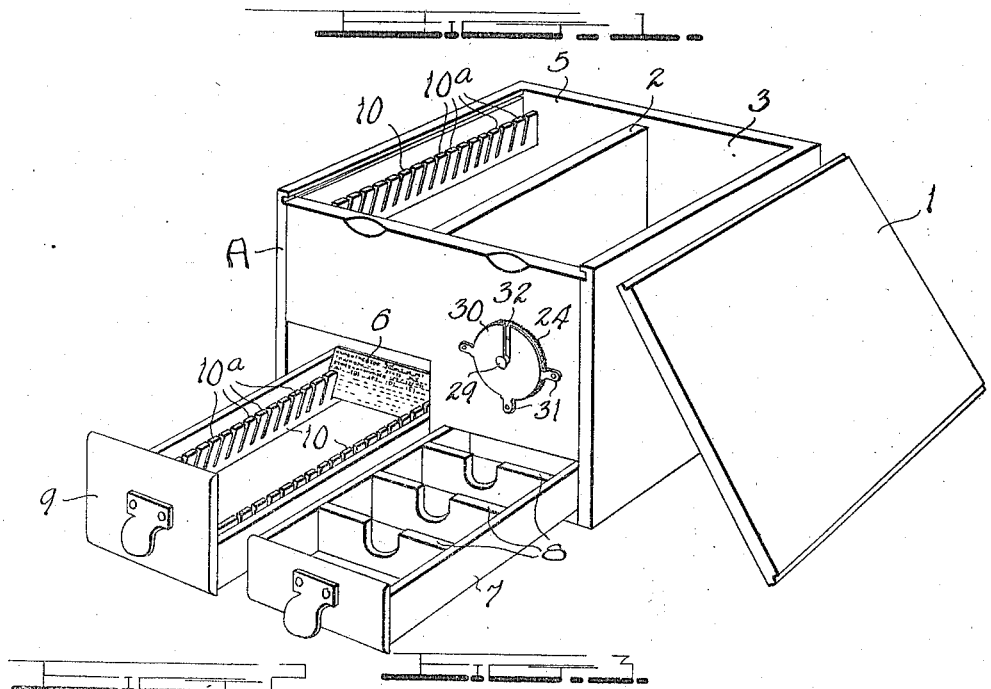
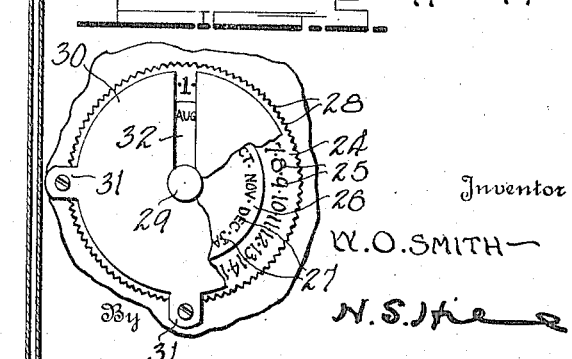
Inventor
W. O. SMITH
By N. S. ...
Attorney

UNITED STATES PATENT OFFICE.

WALTER O. SMITH, OF NEW BEDFORD, MASSACHUSETTS.

FOLLOW-UP INDEX FOR COLLECTION SYSTEMS.

1,196,603.  Specification of Letters Patent.  Patented Aug. 29, 1916.

Application filed September 13, 1915. Serial No. 50,375.

*To all whom it may concern:*

Be it known that I, WALTER O. SMITH, a citizen of the United States, residing at New Bedford, in the county of Bristol, State of Massachusetts, have invented a new and useful Follow-up Index for Collection Systems, and I do hereby declare the following to be a full, clear, and exact description of the invention, such as will enable others skilled in the art to which it appertains to make and use the same.

The present invention relates to a follow up index for collection systems, and has for its object to provide a device of this character which embodies novel features of construction whereby a merchant or other creditor can keep close watch upon the accounts of delinquent debtors and collect many accounts which would be a total loss in the absence of proper attention thereto.

Further objects of the invention are to provide a device of this character which is comparatively simple and inexpensive in its construction, which will require but a small amount of attention, which provides an effective manner for properly looking after the various accounts at all stages in the collection thereof, and which will greatly reduce the loss suffered by merchants through delinquent accounts.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a perspective view of a cabinet provided with a follow up device embodying the features of the invention, the cover of the cabinet being removed and the two drawers withdrawn. Fig. 2 is a plan view of one of the correspondence jackets. Fig. 3 is a vertical longitudinal sectional view through the same. Fig. 4 is an enlarged detail view of one of the index cards. Fig. 5 is an enlarged detail view of the indicator which is applied to the front of the cabinet to tell the merchant when the next account should receive attention.

Corresponding and like parts are referred to in the following description and indicated in all the views of the drawing by the same reference characters.

Referring to the drawings, the reference character A designates a cabinet or case which is provided at the top thereof with a removable cover 1, said cover being shown in the present instance as constructed to slide into and out of position upon the cabinet. A vertical partition 2 extends longitudinally through the cabinet A from the front to the rear thereof and divides the upper portion of the cabinet into a right hand compartment 3 adapted to receive the correspondence jackets 4, and a left hand compartment 5 adapted to receive a set of the index cards 6. A drawer 7 is mounted under the bottom of the compartment 3 and is slidable through the front of the cabinet A, said drawer being subdivided by partitions 8 into a series of compartments or spaces adapted to receive pads of a series of dunning notices which are designed to be attached to successive statements of account or bills which are to be sent to the delinquent debtor in proper sequence. A drawer 9 is also arranged under the compartment 5 and constructed to slide through the front of the cabinet, said drawer 9 being designed to receive a set of the index cards 6.

Both the compartment 5 and the drawer 9 are provided at opposite sides thereof with longitudinally extending racks 10 constructed to receive the index cards 6 and support the same in a rearwardly inclined position so that the name of the debtor at the top of each of the cards is visible over the upper edge of the next adjacent card to the front thereof, thereby enabling any particular index card to be quickly located and removed without the necessity of handling or disturbing any of the other index cards. These racks 10 are in the nature of strips formed with corresponding upwardly projecting arms 10ᵃ which are inclined rearwardly so as to support the various cards in an inclined position and also hold the cards in a spaced relation to each other. By pulling out the drawer 9 and removing the top 1 the merchant or other operator has all of the index cards 6 in plain view and the name of the debtor at the top of each of the index cards is plainly displayed so that any one of the cards can be located without difficulty and without the necessity of handling or fingering the other cards.

The index cards 6 are reversible, being provided at both of the longitudinal edges thereof with spaces to receive the name of the debtor, and one of the longitudinal edges being marked as by means of a heavy black line 11 to distinguish it from the other longitudinal edge. This black line 11 is originally at the bottom or lower edge of the index card, and for the purpose of distinguishing between the two edges of the card, the edge provided with the black line will for the sake of convenience be termed the lower edge. At the top of each of the index cards 6, spaces are provided at 12 to receive the name and address of the debtor, as well as the amount of the bill, the name of the debtor appearing on the top line so that it will be visible over the top of any of the cards in front of the particular card when the card is in position upon the racks 10. Spaces 13 are provided under the spaces 12 and indicated by suitable characters such as the letters "A," "B," "C" and "D," said spaces being designed to receive the dates upon which the successive dunning notices have been sent to the debtor. The lower edge of the index card 6 is provided with a line 14 to receive the name of the debtor and the date upon which he may have responded to any of the notices sent to him. Spaces 15 are also provided to receive data concerning the amount of any payments which may have been made, and other pertinent data or remarks which should appear upon the card. The indicating characters for the spaces 14 and 15 are inverted with respect to the indicating characters for the spaces 12 and 13, so that the characters written in the spaces 12 and 13 are in an upright position when the unmarked edge of the card is at the top, and the characters in the spaces 14 and 15 are in an upright position when the card is inverted and the edge with the black line 11 thereon is at the top. In either instance the name of the debtor is located adjacent the then upper edge of the card so as to be clearly visible when the card is in position within the cabinet.

The merchant or other person using the index, first makes out a card 6 for each debtor, placing the necessary data in the spaces 12 and 13 and keeping the edge of the card with the black line 11 at the bottom. The various dunning notices are sent out at proper intervals of time, the dates of sending these notices being marked in the spaces 13. If the debtor fails to respond to any of the notices which are thus sent, the account may be classed as bad and should either be turned over to an attorney for collection or credited to profit and loss. As soon as one of the debtors makes a response to any of the notices sent to him, and promises to settle the account, the index card 6 is withdrawn and replaced in the cabinet in an inverted position with the black line 11 at the top thereof, the name of the debtor being written in the space 14, and any necessary memorandum or notes being placed in the spaces 15. At the same time, one of the correspondence jackets 4 is made out and filed in the compartment 3 of the cabinet. The black line 11 at the top of the index card 6 tells the merchant that the debtor has made a promise to pay, and the account is to be followed up from the correspondence jacket. The front of each of the correspondence jackets 4 is provided at the top thereof with suitable spaces 16 to receive the name and address of the debtor, as well as other pertinent notes and data relating to the account. Under the spaces 16 at the top of the jacket, vertical columns 17, 18 and 19 may be provided, the column 17 receiving the dates of letters sent to the debtor, the column 18 the dates of personal calls from the debtor, and the column 19 the amounts and dates of various payments which may have been made. Copies of any correspondence and memorandums of promises or agreements may be kept within the correspondence jackets 4, and each of the jackets is provided with a signal for indicating when the account next requires attention. Projecting upwardly from the back of each of the correspondence jackets 4 is an extension or tab 20 which is divided by intersecting horizontal and vertical tear lines 21 into a series of horizontal rows of small cards or tickets 22. The date when the debtor has promised to make a payment, or when the account next requires attention is to be written as indicated at 23 upon the right hand card 22 of the top horizontal row of cards, the remainder of the cards 22 in the horizontal row being severed from engagement with the particular card 22 and folded downwardly so that the card 22 having the date thereon will project upwardly and be prominently displayed. When the account has received the necessary attention on the date indicated, the old card 22 may be completely removed and the next date upon which the account requires attention placed upon the next card in the upper row, said card being bent upwardly so as to project upwardly and be prominently displayed. In this manner the various cards 22 may be successively used as signals to indicate the dates upon which the account needs attention, each one of the cards being torn off and destroyed after being used, so as to avoid any possibility of confusion. The various correspondence jackets 4 may all be filed in the compartment 3, preferably in chronological order, and the signal system provided by the cards 22 of the extensions 20 provides a very satisfactory means for enabling the merchant to keep proper watch over the accounts.

An indicator may be provided on the front of the cabinet A to tell the merchant when the next account requires attention, thereby avoiding the unnecessary opening of the cabinet. This indicator may be of any suitable construction, being shown in the present instance as including a large disk 24 provided with a peripheral row of numerals 25 ranging from 1 to 31 inclusive, and a smaller disk 26 arranged concentrically over the disk 24 and having the various months of the year indicated upon the periphery thereof at 27. The two disks are pivotally mounted upon the front of the cabinet so as to be susceptible of independent rotation, the edge of the disk 24 being roughened at 28 so that it can be readily turned by the fingers, while the disk 26 is provided with a knob 29 for turning the same. A cover plate 30 fits over the disks, being provided with lateral extensions 31 which are deflected inwardly and secured to the front of the cabinet, and being also provided with a view opening or slot 32 through which the peripheral rows of characters 25 and 27 of the two disks are successively displayed as the disks are rotated. The disks can thus be set to indicate the month and day upon which the next one of the accounts needs attention, and there will then be no necessity for the merchant to open the cabinet and finger over the cards and jackets before that particular date.

It will be understood that the cabinet may be made in any desired size, depending upon the number of accounts to be handled, and that any desired number of drawers or compartments may be provided for the reception of the index cards and correspondence jackets, as may be found best suited for the particular purposes of the person using the index. It is to be understood that the racks may be used in any relation that a visible card index is desired and in other relations in which its use will be advantageous or desirable.

Having thus described the invention, what I claim as new and desire to secure by Letters Patent, is:—

1. An index device of the character described, including a card receiving compartment, index cards having name receiving spaces adjacent the edges thereof, and rack strips arranged within the card receiving compartment and formed with upwardly extending and rearwardly inclined arms for supporting the index cards in an inclined position with all of the name receiving spaces of the several cards visible.

2. An index device of the character described, including a card receiving compartment, reversible index cards provided adjacent opposite longitudinal edges thereof with name receiving spaces and having a distinctive marking upon one of the longitudinal edges, and a rack within the card receiving compartment for supporting the index cards in a rearwardly inclined position with the name receiving spaces at the then upper edges of all of the cards visible.

3. An index device of the character described, including a card receiving compartment and reversible index cards provided with name receiving spaces adjacent opposite edges thereof and one of the edges being distinctively marked to distinguish it from the other edge so that the reversal of the card within the compartment can be used as a signal means.

4. An index card having name receiving spaces adjacent the opposite edges thereof and one of the edges being marked with a distinctive line to distinguish it from the other edge so that the reversing of the card can be used as a signal.

5. An index device of the character described, including a card receiving compartment and a jacket receiving compartment, reversible index cards arranged within the card receiving compartment and distinctively marked upon one edge thereof so that those cards in an inverted position can be distinguished from the cards in an upright position, and jackets corresponding to the inverted cards arranged within the jacket receiving compartment.

6. An index device of the character described, including a card receiving compartment, a jacket receiving compartment, reversible index cards arranged within the card receiving compartment and having distinctive markings upon one of the edges thereof so that those cards in an inverted position can be distinguished from those cards in an upright position, jackets corresponding to the inverted cards arranged within the jacket receiving chamber, and signal means upon the jackets for indicating the dates when they require attention.

7. An index device of the character described, including a card receiving compartment, a jacket receiving compartment, reversible index cards arranged within the card receiving compartment and having distinctive markings upon one of the edges thereof so that those cards in an inverted position can be distinguished from those cards in an upright position, jackets corresponding to the inverted cards arranged within the jacket receiving compartment, and an extension projecting upwardly from each of the jackets and divided by intersecting tear lines into rows of signal cards adapted to have successive dates marked thereon and to be removed after use.

8. A correspondence jacket provided with an extension subdivided by intersecting tear lines into a series of rows of signal cards adapted to have successive dates marked thereon and to be removed after being used.

9. An index device of the character described, including a cabinet provided with a card receiving compartment and a jacket receiving compartment, reversible index cards arranged within the card receiving compartment and having a distinctive marking upon one of the edges thereof so that the inverted cards can be clearly distinguished, jackets corresponding to the inverted cards and arranged within the jacket receiving compartment, date signaling means upon the jackets, and an indicator upon the exterior of the cabinet for indicating the next date when one of the correspondence jackets requires attention.

In testimony whereof I have signed my name to this specification in the presence of two subscribing witnesses.

WALTER O. SMITH.

Witnesses:
HENRY W. SMITH,
JOSEPH S. GRACIA.

Copies of this patent may be obtained for five cents each, by addressing the "Commissioner of Patents, Washington, D. C."